US011669252B1

(12) United States Patent
Morita et al.

(10) Patent No.: US 11,669,252 B1
(45) Date of Patent: Jun. 6, 2023

(54) STORAGE SYSTEM AND CRYPTOGRAPHIC OPERATION METHOD

(71) Applicant: Hitachi, Ltd., Tokyo (JP)

(72) Inventors: Shumpei Morita, Tokyo (JP);
Tomoyuki Kamazuka, Tokyo (JP);
Hideaki Monji, Tokyo (JP); Yuusaku Kiyota, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/939,024

(22) Filed: Sep. 7, 2022

(30) Foreign Application Priority Data

May 31, 2022 (JP) .............................. JP2022-088767

(51) Int. Cl.
*G06F 3/06* (2006.01)
*G06F 21/60* (2013.01)

(52) U.S. Cl.
CPC .......... *G06F 3/0622* (2013.01); *G06F 3/0631* (2013.01); *G06F 3/0683* (2013.01); *G06F 21/602* (2013.01)

(58) Field of Classification Search
CPC .... G06F 3/0622; G06F 3/0631; G06F 3/0683; G06F 21/602; G07B 2017/00846; G06Q 20/3829; H04W 12/04; H04W 12/047; H04L 9/08
See application file for complete search history.

(56) References Cited

U.S. PATENT DOCUMENTS

| 9,245,140 B2 * | 1/2016 | Hashimoto ........... H04L 9/0816 |
| 10,284,367 B1 * | 5/2019 | Miller ................... H04L 63/061 |
| 2008/0240441 A1 | 10/2008 | Kawakami |
| 2011/0238938 A1 * | 9/2011 | Kloeppner .......... G06F 11/2089 |
| | | 711/E12.103 |
| 2019/0073318 A1 * | 3/2019 | Vaknin ................ G06F 12/1441 |

FOREIGN PATENT DOCUMENTS

JP 2008-250779 A 10/2008

OTHER PUBLICATIONS

J. Regula, M. Subramaniyan and J. Dodson, "Integrating rack level connectivity into a PCIe switch," 2013 IEEE Hot Chips 25 Symposium (HCS),2013, pp. 1-26, doi: 10.1109/HOTCHIPS.2013.7478310. (Year: 2013).*
C. Meijer and B. van Gastel, "Self-Encrypting Deception: Weaknesses in the Encryption of Solid State Drives," 2019 IEEE Symposium on Security and Privacy (SP), San Francisco, CA, USA, 2019, pp. 72-87, doi: 10.1109/SP.2019.00088. (Year: 2019).*

* cited by examiner

*Primary Examiner* — Khoa D Doan
(74) *Attorney, Agent, or Firm* — Mattingly & Malur, PC

(57) ABSTRACT

A storage system that can achieve a cryptographic operation circuit that supports multiple types of cryptographic operation formats. The cryptographic operation circuit is provided that encrypts data according to the format determined by the processor based on a request by the host terminal for writing the data into the storage device, and decrypts the encrypted data on the data stored in the storage device according to the format determined by the processor based on a request by the host terminal for reading the data from the storage device.

9 Claims, 15 Drawing Sheets

| ADDRESS RANGE | KEY INDEX | ENCRYPTION KEY |
|---|---|---|
| 0x0000_0000～0x0FFF_FFFF | 1 | AAABCDEEEE |
| 0x1000_0000～0x1FFF_FFFF | 2 | BCBCDDDDEE |
| 0x2000_0000～0x3FFF_FFFF | 3 | ABACAEEEBD |
| ... | ... | ... |

201 — ADDRESS RANGE
202 — KEY INDEX
203 — ENCRYPTION KEY

| ADDRESS RANGE | FORMAT |
|---|---|
| 0x0000_0000～0x0FFF_FFFF | SAS |
| 0x1000_0000～0x1FFF_FFFF | NVMe |
| 0x2000_0000～0x3FFF_FFFF | SAS |
| ... | ... |

301 — ADDRESS RANGE
302 — FORMAT

FIG. 4

| ADDRESS RANGE | CRYPTOGRAPHIC OPERATION NECESSITY |
|---|---|
| 0x0000_0000~0x0FFF_FFFF | ENCRYPTION ACTION |
| 0x1000_0000~0x1FFF_FFFF | NON-CRYPTOGRAPHIC ACTION |
| 0x2000_0000~0x3FFF_FFFF | ENCRYPTION ACTION |
| ... | ... |

FIG. 5

| KEY INDEX | ENCRYPTION KEY |
|---|---|
| 1 | AAABCDEEEE |
| 2 | BCBCDDDDEE |
| 3 | ABACAEEEBD |
| 4 | ... |

STORAGE SYSTEM AND CRYPTOGRAPHIC OPERATION METHOD

CROSS-REFERENCE TO RELATED APPLICATION

This application claims priority pursuant to 35 U.S.C. § 119 from Japanese Patent Application No. 2022-088767, filed on May 31, 2022, the entire disclosure of which is hereby incorporated herein by reference.

BACKGROUND

Technical Field

The present invention generally relates to a storage system of performing a cryptographic operation.

Description of the Related Art

RELATED ART

In a storage system, a host terminal is coupled to a front-end network, and drive boxes are coupled to a back-end network independent of the front-end network.

Conventionally, a FC (Fabre Channel) network or the Ethernet (R) is mainly used as the front-end network, and an SAS (Serial Attached SCSI) network is used as the back-end network. Each drive box is JBOD (Just a Bunch Of Disks). Multiple SAS drives, SATA drives and so forth are mounted in a slot of the drive box.

In recent years, for improvement in the performance of the storage system, flash drives, such as SSDs (Solid State Drives), intending performance improvement, have appeared, and the NVMe protocol most suitable for the flash drives has been standardized. For improvement in high extendibility of drive coupling by network coupling, the NVMe-oF (NVMe over Fabrics) protocol standard allowing the NVMe protocol to be used on the network has appeared, and FBOF (Fabric-attached Bunch of Flash) that is a drive box corresponding to NVMe-oF has been introduced.

In recent years, with improvement in security consciousness, introduction of cryptographic functions with FIPS "Level2" or higher, which are standards and guidelines issued by the National Institute of Standards and Technology (NIST), is underway. It is difficult for a cryptographic operation through software by a CPU (Central Processing Unit) to obtain FIPS "Level2" or higher. A cryptographic operation through hardware by a circuit is required instead.

As to this point, in the cases of the SAS protocol and the NVMe protocol, the cryptographic operation is performed on a disk board of a drive box. In the case of the NVMe-oF protocol, the cryptographic operation is performed by a smart NIC (Network Interface Card). Furthermore, in Japanese Patent Application Laid-Open Publication No. 2008-250779 (Patent Literature 1), there is disclosed that a controller includes a cryptographic circuit for the sake of allowing an encryption policy desired by a user to be applied to data received from a host terminal or the like.

SUMMARY OF THE INVENTION

A recent storage system has a configuration where drives with multiple types of protocols are coupled to a controller. The individual drives and the controller perform data communication with each other according to the protocols different among the drives. Here, in a case where cryptographic operations are performed in the respective drives, the specifications (formats) of the cryptographic operations are different with respect to the protocols. In the case where the cryptographic operations are performed in the respective drives as described above, the security levels are not uniform. Accordingly, the security level of the storage system conforms to the lowest security level. It is required to achieve FIPS "Level2" or higher for each drive.

Accordingly, the cryptographic operation is required to be performed by a single type of cryptographic operation circuits. However, Patent Literature 1 does not disclose a technology of performing the cryptographic operation according to multiple types of cryptographic operation formats. Accordingly, there is a problem in that the cryptographic operation circuits are required to be created for each drive.

The present invention has been made in view of the above points, and proposes a storage system and the like capable of achieving a cryptographic operation circuit that supports multiple types of cryptographic operation formats.

According to the present invention to solve such a problem, a storage system includes: a plurality of storage devices configured to store encrypted data; and a controller configured to control input and output to and from each of the plurality of storage devices, wherein the controller includes: a memory configured to store format management information that includes information indicating a format of a cryptographic operation corresponding to each of the storage devices; a processor configured to determine the format corresponding to the storage device, from the format management information, based on a request by a host terminal for input and output to and from the storage device; and a cryptographic operation circuit configured to encrypt data according to the format determined by the processor based on a request by the host terminal for writing the data into the storage device, and decrypt the encrypted data on the data stored in the storage device according to the format determined by the processor based on a request by the host terminal for reading the data from the storage device.

According to the configuration described above, even in a case where the formats of cryptographic operations are different among the storage devices, the format of the cryptographic operation suitable for the storage device is determined by the processor. Accordingly, the cryptographic operation according to the format determined by the processor is performed by the cryptographic operation circuit. According to the configuration described above, for example, without creation of the cryptographic operation circuits for each storage device, encryption by hardware can be achieved.

The present invention can achieve a highly usable storage system. Problems, configurations and advantageous effects other than those of the above description are clearly presented in the following description of embodiments.

BRIEF DESCRIPTION OF THE DRAWINGS

FIG. 2 shows an example of registered key information according to the first embodiment;

FIG. 3 shows an example of format management information according to the first embodiment;

FIG. 4 shows an example of encryption setting information according to the first embodiment;

FIG. 5 shows an example of key information according to the first embodiment;

Figure 1:
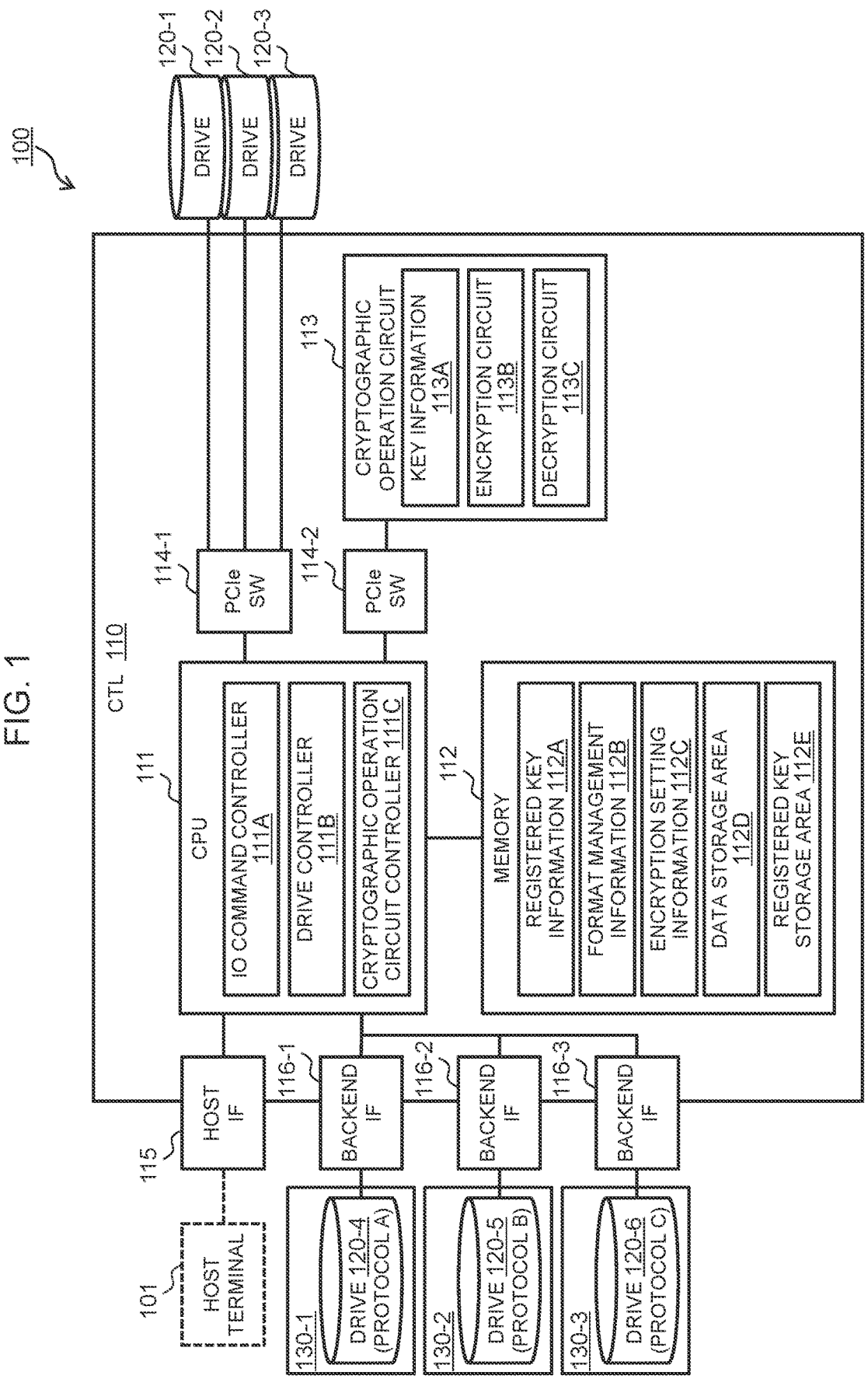
FIG. 1 shows an example of a configuration pertaining to a storage system according to a first embodiment.

DETAILED DESCRIPTION OF THE EMBODIMENTS (I) First Embodiment

Hereinafter, individual embodiments of the present invention are described in detail. However, the present invention is not limited to the embodiments.

A storage system of the embodiment has a configuration that includes a controller (hereinafter, sometimes written as a CTL), and multiple types of storage devices. The controller includes a processor, and a cryptographic operation circuit. Upon receipt of any of input and output (IO: INPUT/OUTPUT) requests from the host terminal, the processor determines the format of a cryptographic operation. The cryptographic operation circuit performs a cryptographic operation, based on the result of determination by the processor. The controller outputs data subjected to the cryptographic operation, to the host terminal, the storage devices and the like.

The configuration described above can achieve the cryptographic operation circuit that supports multiple types of cryptographic operation formats.

Representation of "first", "second", "third" and the like in this specification and the like are assigned to identify configuration elements, and does not necessarily limit the number or order of elements. Numerals for identifying the configuration elements are used for each context. A numeral used in one context does not necessarily indicate the same component in another context. The representation does not preclude that a configuration element identified by a certain numeral also has another function of a configuration element identified by another numeral.

Next, the embodiments of the present invention are described with reference to the drawings. The following description and drawings are examples for describing the present invention. To clarify the description, omission and simplification are appropriately performed. The present invention can be implemented as other various embodiments. Unless specifically limited, the number of individual configuration elements may be one or more.

Note that in the following description, the same elements in the drawings are assigned the same numerals, and description is appropriately omitted. In a case of description without discrimination between the same types of elements, the common part (a part from which any branch number is excluded) of a reference symbol including a branch number is used. In a case of description with the same type of elements being discriminated from each other, the reference symbols including branch numbers are sometimes used. For example, in a case of description without specific discrimination of drives, description is sometimes made as "drive 120". In a case of description with individual drives being discriminated from each other, description is made as "drive 120-1" and "drive 120-2".

In FIG. 1, reference numeral 100 generally denotes a storage system according to a first embodiment.

The storage system 100 has a configuration including a CTL 110, and multiple types of drives 120.

The CTL 110 is an example of a node, and controls input and output to and from the drives 120 in response to an IO command issued by a host terminal 101. Here, the host terminal 101 includes a communication interface (communication IF), an operating system (OS), and an application program. For example, when the application program performs data processing, such as a file operation, the host terminal 101 transmits an IO command corresponding to the data processing, from the communication IF to the CTL 110 via a communication network, such as a SAN (Storage Area Network).

The IO commands include a write command that requests writing data to the drive 120, and a read command that requests reading data from the drive 120. Upon receipt of the write command from the host terminal 101, the CTL 110 executes a write process in accordance with the type of the write-target drive 120. Upon receipt of the read command, the CTL 110 executes a read process in accordance with the type of the read-target drive 120.

More specifically, the CTL 110 has a configuration that includes a CPU 111, a memory 112, a cryptographic operation circuit 113, a PCIeSW (Peripheral Component Interconnect Express Switch) 114, a host IF 115, and backend IFs 116.

The CPU 111 is an example of a processor, and includes one or more processor cores. The CPU 111 reads and executes the program stored in the memory 112, the drives 120 and the like, thereby achieving the functions of an IO command controller 111A, a drive controller 111B, a cryptographic operation circuit controller 111C and the like.

Note that the CTL 110 may include another processor instead of or in addition to the CPU 111. For example, the processor is one or more processors. At least one processor is, typically, a microprocessor, such as the CPU 111. Alternatively, the processor may be another type of processors, such as a GPU (Graphics Processing Unit). At least one processor may be a single core or a multicore one. At least one processor may be a processor in a broad sense, such as a hardware circuit (e.g., an FPGA (Field-Programmable Gate Array) or an ASIC (Application Specific Integrated Circuit)) that performs part of or the entire process.

The IO command controller 111A interprets the IO command transmitted from the host terminal 101. The drive controller 111B issues an IO command (e.g., a drive transfer instruction described later) to the drive 120, based on the IO command. The cryptographic operation circuit controller 111C issues a cryptographic operation command (e.g., a circuit transfer instruction described later) to the cryptographic operation circuit 113, based on the IO command. Note that information on the drive transfer instruction, the circuit transfer instruction and the like is accumulated. The drives 120 and the cryptographic operation circuit 113 start a transfer instruction process, at appropriate timing, such as timing when the process in execution is completed, or timing when the processing load becomes lower than a threshold.

The memory 112 temporarily stores data (write data) transmitted with the write command from the host terminal 101, data (read data) which has been read from the drive 120 based on the read command and with which a reply is to be transmitted to the host terminal 101, encrypted data to be written in the drive 120, and encrypted data read from the drives 120. The memory 112 stores various cryptography-related information pertaining to cryptographic operations performed in the CTL 110, besides the communication data, such as the write data and the read data. The cryptography-related information includes registered key information 112A, format management information 112B, and encryption setting information 112C.

The memory 112 includes a data storage area 112D and a registered key storage area 112E, as storage areas for storing data to be saved on the memory 112.

Note that the memory 112 is one or more memories, and may typically be a main memory device. At least one memory in the memory 112 may be a volatile memory or a nonvolatile memory.

The cryptographic operation circuit 113 is a circuit that generates encrypted data by encrypting communication data (e.g., write data), and reconstructs communication data (e.g., read data) by decrypting the generated encrypted data, in accordance with circuit transfer instructions issued by the CPU 111. The cryptographic operation circuit 113 is, for example, an FPGA. Hereinafter, plain data that can be used without any operation, such as decryption or interpretation, is exemplified as the communication data, and description is made.

More specifically, the cryptographic operation circuit 113 has a configuration that stores key information 113A, and has a configuration that includes an encryption circuit 113B and a decryption circuit 113C. The key information 113A is information for allowing the cryptographic operation circuit 113 to manage the encryption key. The encryption circuit 113B is a circuit for encrypting plain data using the encryption key managed by the key information 113A (converting the plain data into encrypted data). The decryption circuit 113C is a circuit for decrypting the encrypted data using the encryption key managed by the key information 113A (converting the encrypted data into the plain data). Hereinafter, symmetric-key cryptography that uses the same encryption key for encryption and decryption is exemplified, and description is made.

Note that FIG. 1 shows a configuration that includes one cryptographic operation circuit 113. However, this embodiment is not limited to this configuration. For example, multiple cryptographic operation circuits 113 may be provided depending on the number of drives 120 and the amount of data stored in the drives 120.

The PCIeSW 114 is a chip (an IC chip, a microchip and so forth) that is positioned between the CPU 111 and the PCIe coupling device and manages connection and data. The PCIeSW 114-1 communicably couples the CPU 111 to the drive 120-1, the drive 120-2 and the drive 120-3. The PCIeSW 114-2 communicably couples the CPU 111 to the cryptographic operation circuit 113.

In this embodiment, a configuration is described where the cryptographic operation circuit 113 is coupled to the CPU 111 via the PCIeSW 114-2. Note that the embodiment is not limited to this configuration. For example, the cryptographic operation circuit 113 may have a configuration directly coupled to the CPU 111, a configuration coupled to the CPU 111 via another configuration element in the CTL 110, or a configuration coupled to the CPU 111 in another mode. Any mode allowing the cryptographic operation circuit 113 and the CPU 111 to be coupled to each other may be adopted.

Further alternatively, not only the cryptographic operation circuit 113, but also another accelerator (an example of the PCIe coupling device), such as a compression and decompression circuit, may be coupled to the PCIeSW 114-2.

The host IF 115 controls communication between the host terminal 101 and the CTL 110. The write command and the write data issued by the host terminal 101 are received by the host IF 115. The read data read according to the read command, and a notification indicating completion of the process of the read command are transmitted from the host IF 115 to the host terminal 101.

The backend IFs 116 control communication between the drives 120 and the CTL 110. The backend IFs 116 perform a conversion operation and the like between logical block addresses (LBA) and physical addresses of the drives 120.

The drives 120 are examples of the storage devices, and store various types of data. The drive 120-1, the drive 120-2 and the drive 120-3 are, for example, internal drives and are NVMe drives that perform processes in conformity with the NVMe protocol. Data stored in the NVMe drive directly coupled to the PCIeSW 114-1 cannot be subjected to a cryptographic operation, such as on a disk board, but can be subjected to a cryptographic operation by the cryptographic operation circuit 113 in the CTL 110.

The drive 120-4 is, for example, a drive that is mounted on a drive box 130-1 (enclosure) and performs processes in conformity with a protocol A (e.g., an SAS drive that performs processes in conformity with the SAS protocol), and is communicably coupled to the CTL 110 via a disk board. The drive 120-5 is, for example, a drive that is mounted on a drive box 130-2 and performs processes in conformity with a protocol B (e.g., a self-encrypting drive (SED) that performs processes in conformity with a protocol B, and is communicably coupled to the CTL 110 via a smart NIC. The drive 120-6 is, for example, a drive that is mounted on a drive box 130-3 (e.g., an FBOF) and performs processes in conformity with a protocol C, and is communicably coupled to the CTL 110 via a smart NIC. Note that each drive box 130 has a configuration that includes a controller board, a LAN (Local Area Network) board, a channel board, a disk board, and a power source.

Note that the CTL 110 may be provided with a predetermined communication IF, to which a management terminal may be communicably coupled. The management terminal has a configuration as a computer device, and is coupled to the CTL 110 via a communication network, such as a LAN. For example, the management terminal includes a storage management software. The storage management software is a program for managing the configuration of and setting information on the CTL 110, and obtaining and displaying various types of information on the CTL 110. The user can perform various settings pertaining to cryptographic operations by operating a management screen provided by the storage management software.

FIG. 2 shows an example of registered key information 112A (registered key table 200).

The registered key table 200 is a table for allowing the CPU 111 to manage the encryption key with respect to each physical address range (address range) indicating a predetermined storage area in the drive 120. More specifically, the registered key table 200 stores a record that associates data items on an address range 201, on a key index 202 and on an encryption key 203 with each other. Note that the registered key information 112A may be stored in a non-volatile memory, a key management server and so forth.

The address range 201 stores data indicating the address range. As for the address range, the encryption key is set that is used for the cryptographic operation for data to be written in the storage area in the address range or data to be read from the storage area (data to be subjected to the cryptographic operation). Note that one drive 120 may be assigned one address range, or one drive 120 may be assigned multiple address ranges. That is, the encryption key may be set for each of the drives 120, or set for each of predetermined storage areas of the drives 120. The key index 202 stores data indicating identification information capable of uniquely identifying the encryption key in the CTL 110. The encryption key 203 stores data indicating the encryption key.

FIG. 3 shows an example of the format management information 112B (format management table 300).

The format management table 300 is a table for allowing the CPU 111 to manage the specifications (format) of the cryptographic operation with respect to each address range. More specifically, the format management table 300 stores a record that associates data items on an address range 301 and on a format 302 with each other.

The address range 301 stores data indicating the address range. The format 302 stores data indicating the format of the cryptographic operation.

Here, the format of the cryptographic operation may be "SAS", "NVMe" and so forth. For example, according to the format "SAS", "plain data+protection code" is encrypted. According to the format "NVMe", "only plain data" is encrypted, and a protection code (DIF) is added. As described above, the cryptographic operation processing methods are different among the formats of the cryptographic operations. Note that in the format management table 300, the format 302 of the cryptographic operation can be set for each address range 301. Alternatively, the format 302 may be set for each drive 120 or each type of drives 120.

FIG. 4 shows an example of the encryption setting information 112C (encryption setting table 400).

The encryption setting table 400 is a table for allowing the CPU 111 to manage the necessity of the cryptographic operation with respect to each address range. More specifically, the encryption setting table 400 stores a record that associates data items on an address range 401 and on a cryptographic operation necessity 402 with each other.

The address range 401 stores data indicating the address range. The cryptographic operation necessity 402 stores information indicating the necessity of the cryptographic operation for data pertaining to the address range. For example, the user can set the cryptographic operation necessity 402 for each address range indicating the predetermined storage area in the drive 120 through the management terminal or the like.

FIG. 5 shows an example of the key information 113A (key table 500).

The key table 500 is a table for allowing the cryptographic operation circuit 113 to manage the encryption key. More specifically, the key table 500 stores a record that associates data items on a key index 501 and on an encryption key 502 with each other.

The key index 501 stores data indicating information capable of uniquely identifying the encryption key in the CTL 110. The encryption key 502 stores data indicating the encryption key. Furthermore, when the key index 202 and the key index 501 have the same value, it is indicated that the encryption key is the same.

Figure 6:
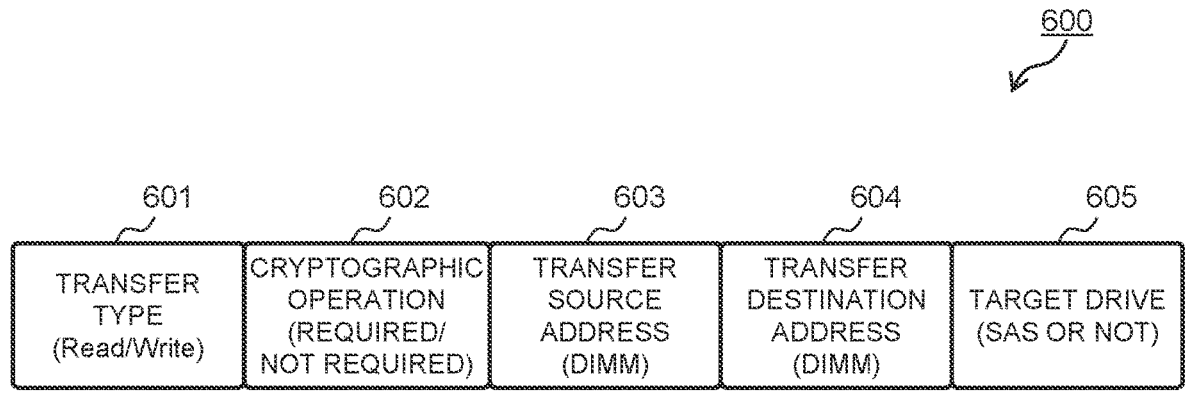
FIG. 6 shows an example of circuit transfer instruction information according to the first embodiment.

FIG. 6 shows an example of information included in the circuit transfer instruction issued from the CPU 111 to the cryptographic operation circuit 113 (circuit transfer instruction information 600).

The circuit transfer instruction information 600 has a configuration that includes information on a transfer type 601, on a cryptographic operation 602, on a transfer source address 603, on a transfer destination address 604 and on a target drive 605.

The transfer type 601 stores information indicating the type of the IO command transmitted from the host terminal 101. For example, when the IO command is a write command, "Write" is stored in the transfer type 601. When the IO command is a read command, "Read" is stored in the transfer type 601. The cryptographic operation 602 stores information indicating the necessity of the cryptographic operation. For example, when the cryptographic operation is required, the cryptographic operation 602 stores "the value of the key index 202". When the cryptographic operation is not required, "value indicating unnecessity" is stored.

The transfer source address 603 stores information indicating the address of a storage area on the memory 112 that stores data (transfer source data) to be subjected to a cryptographic operation by the cryptographic operation circuit 113. The transfer destination address 604 stores information indicating the address of a storage area on the memory 112 that stores data (transfer destination data) subjected to a cryptographic operation by the cryptographic operation circuit 113. Note that, on one hand, when the IO command is a write command, the transfer source data is plain data, and the transfer destination data is encrypted data. On the other hand, when the TO command is a read command, the transfer source data is encrypted data, and the transfer destination data is plain data.

The target drive 605 stores data indicating the format of the cryptographic operation. Hereinafter, the case where the two types that are "SAS" and "NVMe" are provided as the formats of cryptographic operations is exemplified and described.

Figure 7:
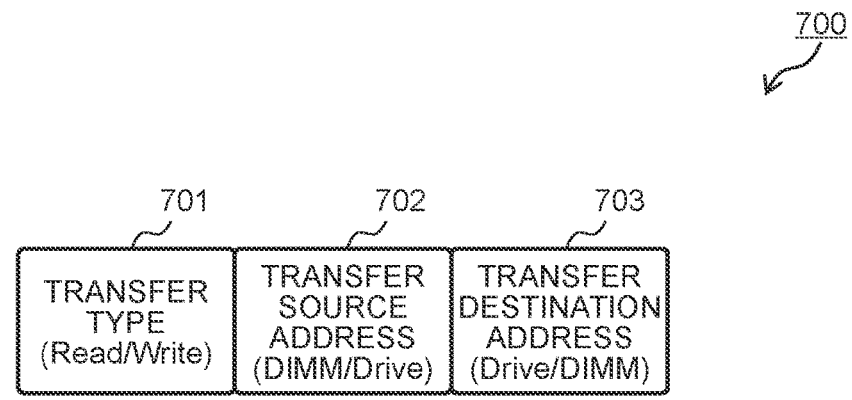
FIG. 7 shows an example of drive transfer instruction information according to the first embodiment.

FIG. 7 shows an example of information (drive transfer instruction information 700) included in the drive transfer instruction issued from the CPU 111 to the drive 120.

The drive transfer instruction information 700 has a configuration that includes information on a transfer type 701, on a transfer source address 702 and on a transfer destination address 703.

The transfer type 701 stores information indicating the type of the IO command transmitted from the host terminal 101. The transfer source address 702 stores information indicating the address of a storage area that stores data (transfer source data) to be subjected to an IO process by the drive 120. The transfer destination address 703 stores information indicating the address of a storage area that stores data (transfer destination data) having been subjected to an IO process by the drive 120.

Note that, on one hand, when the IO command is a write command, the transfer source address 702 stores information on the address of the storage area on the memory 112 at which the encrypted data is stored, and the transfer destination address 703 stores information on the address of a storage area in the drive 120 at which the encrypted data is stored. On the other hand, when the IO command is a read command, the transfer source address 702 stores information on the address of the storage area in the drive 120 at which encrypted data is stored, and the transfer destination address 703 stores information on the address of a storage area on the memory 112 at which encrypted data is stored.

Figure 8:
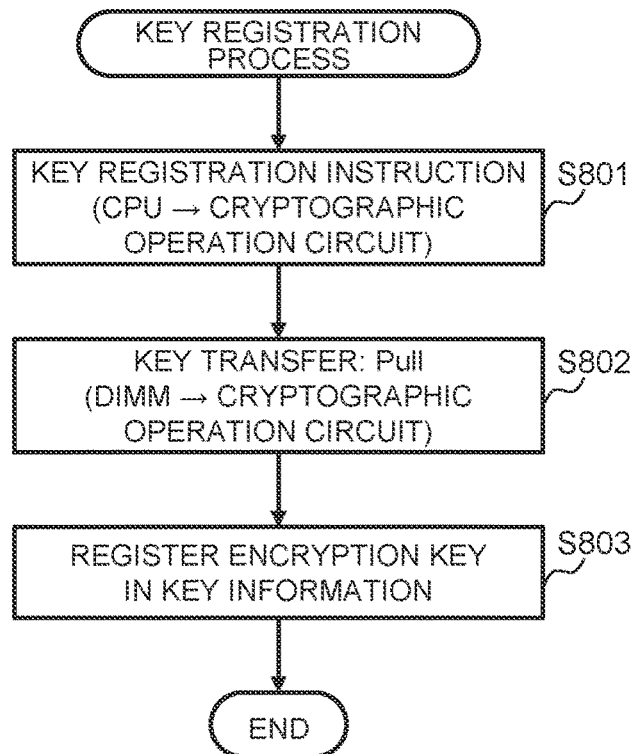
FIG. 8 shows an example of a key registration process according to the first embodiment.

FIG. 8 shows an example of a key registration process. For example, the key registration process is started at a predetermined timing, such as timing when an instruction to register the encryption key is issued by the user through the management terminal, timing of being invoked by a key update process, and timing when the cryptographic operation circuit 113 is initialized.

In S801, the CPU 111 notifies the cryptographic operation circuit 113 of the key registration instruction that includes key registration instruction information. For example, upon receipt of the instruction to register the encryption key from the management terminal or the like, the CPU 111 stores the encryption key in the storage area (address area) on the memory 112 for passing the encryption key, and generates the key registration instruction information that includes the key index for identifying the encryption key, and the address of the storage area at which data on the encryption key is stored.

In S802, the cryptographic operation circuit 113 receives the key registration instruction issued by the CPU 111, and reads data on the encryption key from the address of the storage area on the memory 112 included in the key registration instruction. Note that for example, data on the encryption key may be transferred by DMA (Direct Memory Access).

In S803, the cryptographic operation circuit 113 registers, in the key information 113A, the read data on the encryption key in association with the key index included in the key registration instruction received in S802.

The key registration process allows the cryptographic operation circuit 113 to identify the encryption key used for the cryptographic operation, via the key index notified by the CPU 111.

Figure 9:
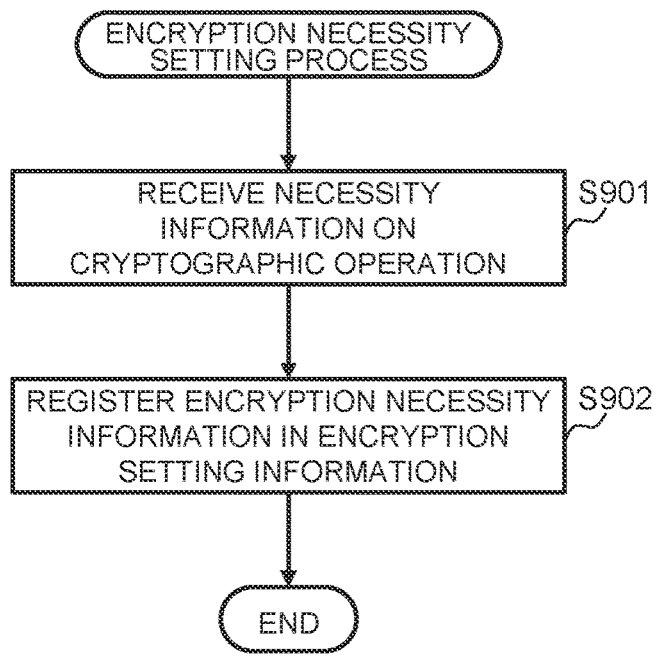
FIG. 9 shows an example of an encryption necessity setting process according to the first embodiment.

FIG. 9 shows an example of an encryption necessity setting process. The encryption necessity setting process is started, for example, at timing of receiving, from the management terminal, necessity information indicating the necessity of the cryptographic operation about the predetermined storage area in the drive 120 designated by the user.

In S901, the CPU 111 receives the necessity information on the cryptographic operation about the predetermined storage area in the drive 120 designated by the user.

In S902, the CPU 111 registers, in the encryption setting information 112C, the necessity information on the cryptographic operation about the address range indicating the predetermined storage area in the drive 120.

Here, a risk resides at what is accompanied by a relatively low security level (what is called a hole). As to this point, a setting of performing the cryptographic operation for all the storage areas of all the drives 120 is configured, which allows the single cryptographic operation circuit 113 to perform the cryptographic operation, makes the security level constant, removes holes, and strengthen the security.

Figure 10:
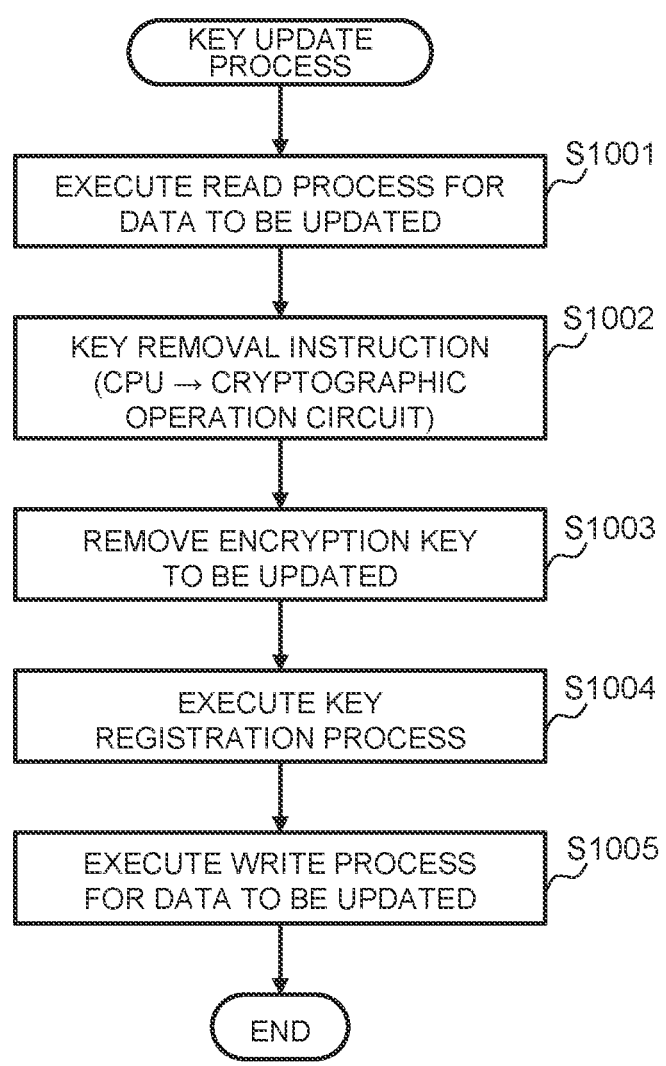
FIG. 10 shows an example of a key update process according to the first embodiment.

FIG. 10 shows an example of a key update process. The key update process is started at predetermined timing. The predetermined timing may be periodic, a predefined date and time, timing designated by the user, or another timing.

In S1001, the CPU 111 executes a read process, described later, for data (data to be updated) in the address range associated with the encryption key to be updated. The read process is described later with reference to FIG. 12.

In S1002, the CPU 111 notifies the cryptographic operation circuit 113 of a key removal instruction that includes key removal instruction information. The key removal instruction information includes information on the key index of the encryption key to be updated.

In S1003, the cryptographic operation circuit 113 removes the information on the encryption key of the key index designated by the key removal instruction, from the key information 113A.

In S1004, the cryptographic operation circuit 113 notifies the CPU 111 of an instruction to register the encryption key to be updated. Upon receipt of the instruction to register the encryption key to be updated, the CPU 111 executes the key registration process.

According to the key registration process, the encryption key to be updated can be used by the cryptographic operation.

In S1005, the CPU 111 executes the write process, described later, for the data to be updated. The write process is described below with respect to FIG. 11.

Figure 11:
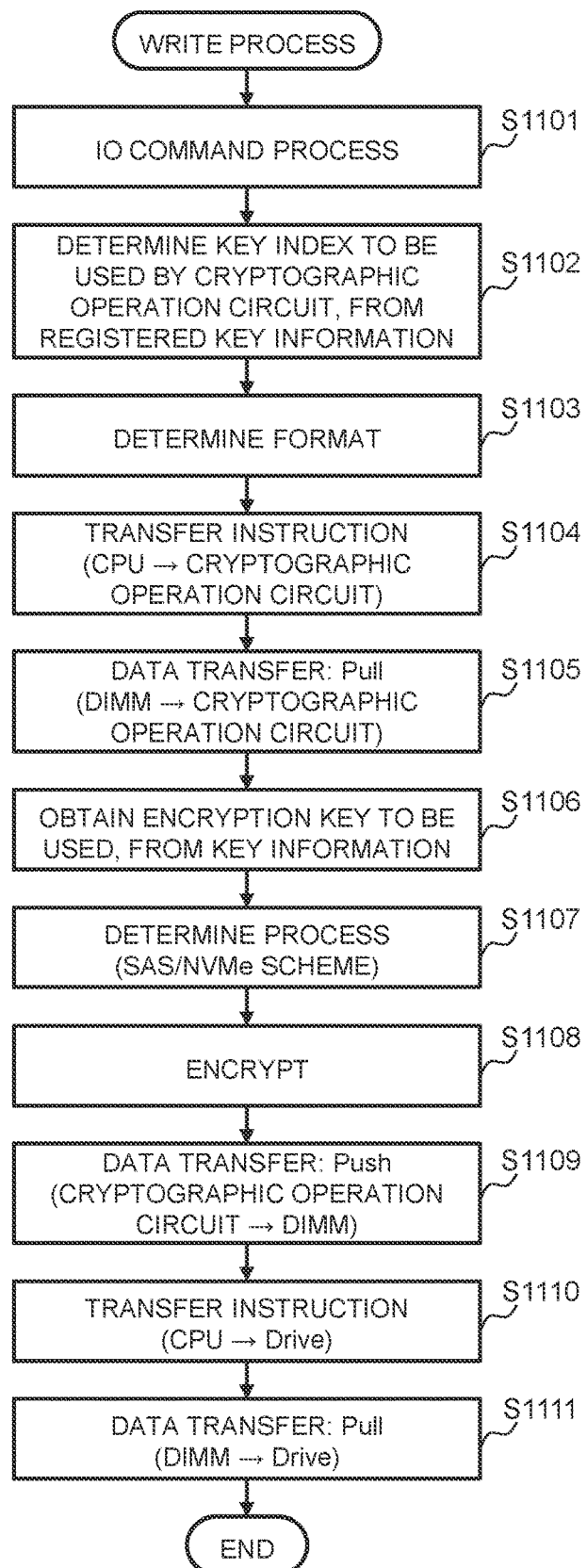
FIG. 11 shows an example of a write process according to the first embodiment.

FIG. 11 shows an example of the write process. The write process is started at predetermined timing, such as timing when the CPU 111 receives the write command, and timing of being invoked by the key update process.

In S1101, the CPU 111 performs the IO command process. In the IO command process, for example, the CPU 111 determines the write command as the type of the IO command. For example, the CPU 111 refers to the encryption setting table 400, identifies a record in the address range 401 having the physical address calculated from the LBA of the IO command, and obtains the value of the cryptographic operation necessity 402 of the identified record.

In S1102, the CPU 111 determines the key index of the encryption key that is used by the cryptographic operation circuit 113, from the registered key information 112A. For example, the CPU 111 refers to the registered key table 200, identifies a record in the address range 201 having the physical address calculated from the LBA of the IO command, and obtains the value of the key index 202 of the identified record.

Note that when the value of the cryptographic operation necessity 402 obtained in S1101 is "non-cryptographic action" indicating that the cryptographic operation is not required, the process in S1102 is not necessarily performed.

In S1103, the CPU 111 determines the format of the cryptographic operation to be used by the cryptographic operation circuit 113, from the format management information 112B. For example, the CPU 111 refers to the format management table 300, identifies a record in the address range 301 having the physical address calculated from the LBA of the IO command, and obtains the value of the format 302 ("SAS" or "NVMe") of the identified record.

In S1104 the CPU 111 notifies the cryptographic operation circuit 113 of the circuit transfer instruction. The CPU 111 generates the circuit transfer instruction information that includes information indicating the write command, information indicating the necessity of the cryptographic operation, information on the address (transfer source address) of the storage area on the memory 112 at which data transmitted with the write command is stored, information on the address (transfer destination address) of the storage area on the memory 112 at which data obtained by encrypting the data is stored, and information that is on the target drive and indicates whether the format of the cryptographic operation is "SAS" or not. Note that the circuit transfer instruction information may be transferred by the DMA to the cryptographic operation circuit 113. When the cryptographic operation is required, the value of the key index is set in the information indicating the necessity of the cryptographic operation. When the cryptographic operation is not required, a value indicating that the cryptographic operation is not required is set.

In S1105, the cryptographic operation circuit 113 reads the data on the memory 112, based on the transfer source address included in the circuit transfer instruction information.

In S1106, the cryptographic operation circuit 113 obtains data on the encryption key to be used, from the key information 113A, based on the key index included in the circuit transfer instruction.

In S1107, the cryptographic operation circuit 113 determines the cryptographic operation processing method, based on information on the target drive included in the circuit transfer instruction.

In S1108, the cryptographic operation circuit 113 encrypts the data read in S1105 by the processing method determined in S1107 using the data on the encryption key obtained in S1106. For example, when the format of the cryptographic operation is "SAS", the cryptographic operation circuit 113 adds the protection code to the data and encrypts them using the encryption key. When the format of the cryptographic operation is "NVMe", this circuit encrypts the data using the encryption key and then adds the protection code to the encrypted data.

In S1109, based on the transfer destination address included in the circuit transfer instruction, the cryptographic operation circuit 113 stores the encrypted data in the storage area at this address on the memory 112.

In S1110, the CPU 111 transmits the drive transfer instruction to the drive 120. For example, the CPU 111 generates the drive transfer instruction information that includes the information indicating the write command, the information on the address (transfer source address) in the storage area on the memory 112 at which the encrypted data is stored, and the information on the physical address (transfer destination address) calculated from the LBA of the IO command. Note that the drive transfer instruction information may be transmitted by the DMA to the drive 120 provided with the storage area at the physical address.

In S1111, the drive 120 obtains the data on the memory 112, based on the transfer source address included in the drive transfer instruction, and stores the obtained data at the transfer destination address included in the drive transfer instruction.

Figure 12:
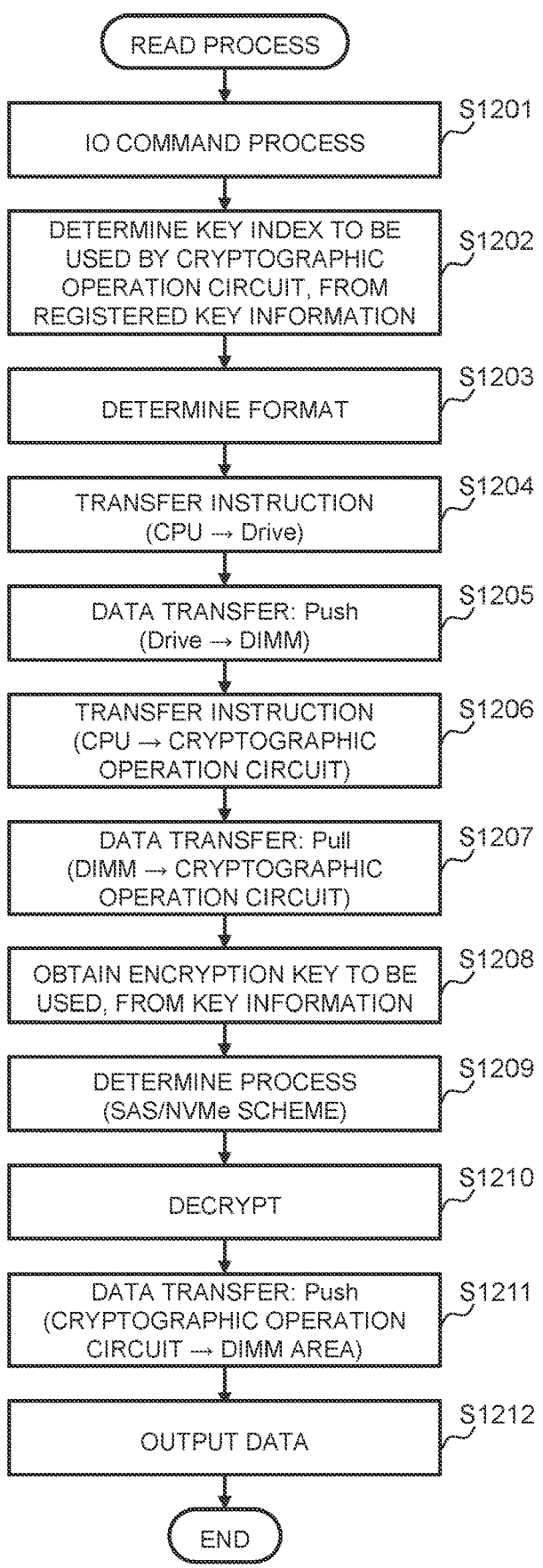
FIG. 12 shows an example of a read process according to the first embodiment.

FIG. 12 shows an example of the read process. The read process is started at predetermined timing, such as timing when the CPU 111 receives the read command, and timing of being invoked by the key update process.

In S1201, the CPU 111 performs the IO command process. In the IO command process, for example, the CPU 111 determines the read command as the type of the IO command. For example, the CPU 111 refers to the encryption setting table 400, identifies a record in the address range 401 having the physical address calculated from the LBA of the IO command, and obtains the value of the cryptographic operation necessity 402 of the identified record.

In S1202, the CPU 111 determines the key index of the encryption key that is used by the cryptographic operation circuit 113, from the registered key information 112A. For example, the CPU 111 refers to the registered key table 200, identifies a record in the address range 201 having the physical address calculated from the LBA of the IO command, and obtains the value of the key index 202 of the identified record.

Note that when the value of the cryptographic operation necessity 402 obtained in S1201 is "non-cryptographic action" indicating that the cryptographic operation is not required, the process in S1202 is not necessarily performed.

In S1203, the CPU 111 determines the format of the cryptographic operation to be used by the cryptographic operation circuit 113, from the format management information 112B. For example, the CPU 111 refers to the format management table 300, identifies a record in the address range 301 having the physical address calculated from the LBA of the IO command, and obtains the value of the format 302 ("SAS" or "NVMe") of the identified record.

In S1204, the CPU 111 transmits the drive transfer instruction to the drive 120. For example, the CPU 111 generates the drive transfer instruction information that includes the information indicating the read command, the information on the physical address (transfer source address) calculated from the LBA of the IO command, and the information on the address (transfer destination address) of the storage area on the memory 112 at which the read data is stored. Note that the drive transfer instruction information may be transmitted by the DMA to the drive 120 provided with the storage area at the physical address.

In S1205, the drive 120 obtains the data on the drive 120, based on the transfer source address included in the drive transfer instruction, and stores the obtained data at the transfer destination address included in the drive transfer instruction.

In S1206 the CPU 111 notifies the cryptographic operation circuit 113 of the circuit transfer instruction. The CPU 111 generates the circuit transfer instruction information that includes information indicating the read command, information indicating the necessity of the cryptographic operation, information on the address (transfer source address) of the storage area on the memory 112 at which data is stored in S1205, information on the address (transfer destination address) of the storage area on the memory 112 at which data obtained by decrypting the data is stored, and information that is on the target drive and indicates whether the format of the cryptographic operation is "SAS" or not. Note that the circuit transfer instruction information may be transferred by the DMA to the cryptographic operation circuit 113.

In S1207, the cryptographic operation circuit 113 reads the data on the memory 112, based on the transfer source address included in the circuit transfer instruction.

In S1208, the cryptographic operation circuit 113 obtains data on the encryption key to be used, from the key information 113A, based on the key index included in the circuit transfer instruction.

In S1209, the cryptographic operation circuit 113 determines the cryptographic operation processing method, based on information on the target drive included in the circuit transfer instruction.

In S1210, the cryptographic operation circuit 113 decrypts the data read in S1207, by the processing method determined in S1209 using the data on the encryption key obtained in S1208. For example, when the format of the cryptographic operation is "SAS", the cryptographic operation circuit 113 decrypts the data using the encryption key and then removes the protection code. When the format of the cryptographic operation is "NVMe", this circuit removes the protection code from the data and then decrypts the data using the encryption key.

In S1211, based on the transfer destination address included in the circuit transfer instruction, the cryptographic operation circuit 113 stores the decrypted data in the storage area at the address on the memory 112.

In S1212, the CPU 111 outputs the data. For example, a reply with the data is sent to the originator of the read command (e.g., the host terminal 101).

Figure 13:
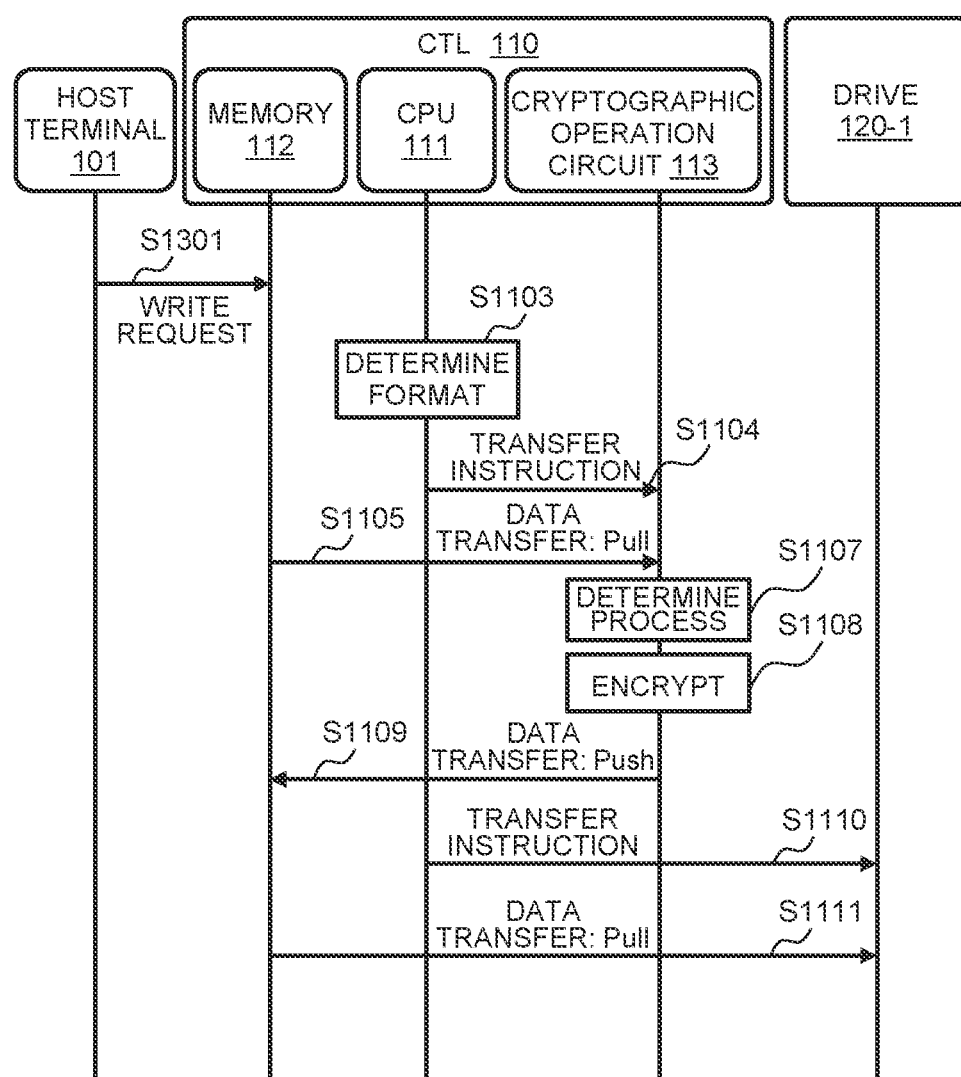
FIG. 13 shows an example of a process flow pertaining to the write process according to the first embodiment.

FIG. 13 shows an example of a process flow pertaining to the write process. In FIG. 13, a case where the write data is written into the internal drive 120-1 is exemplified and described.

When a write request (a write command and write data) is issued by the host terminal 101, the write request is stored in the memory 112 (S1301).

Upon receipt of the write command, the CPU 111 performs format determination (S1103) and the like. The CPU 111 then notifies the cryptographic operation circuit 113 of the circuit transfer instruction (S1104).

Subsequently, the cryptographic operation circuit 113 transfers the write data from the memory 112 to the cryptographic operation circuit 113, based on the circuit transfer instruction (S1105). Subsequently, the cryptographic operation circuit 113 performs process determination (S1107), encryption (S1108) and the like, and transfers the encrypted data from the cryptographic operation circuit 113 to the memory 112 (S1109).

Subsequently, the CPU 111 transmits the drive transfer instruction to the drive 120-1 (S1110).

Subsequently, the drive 120-1 transfers the encrypted data from the memory 112 to the drive 120-1.

Figure 14:
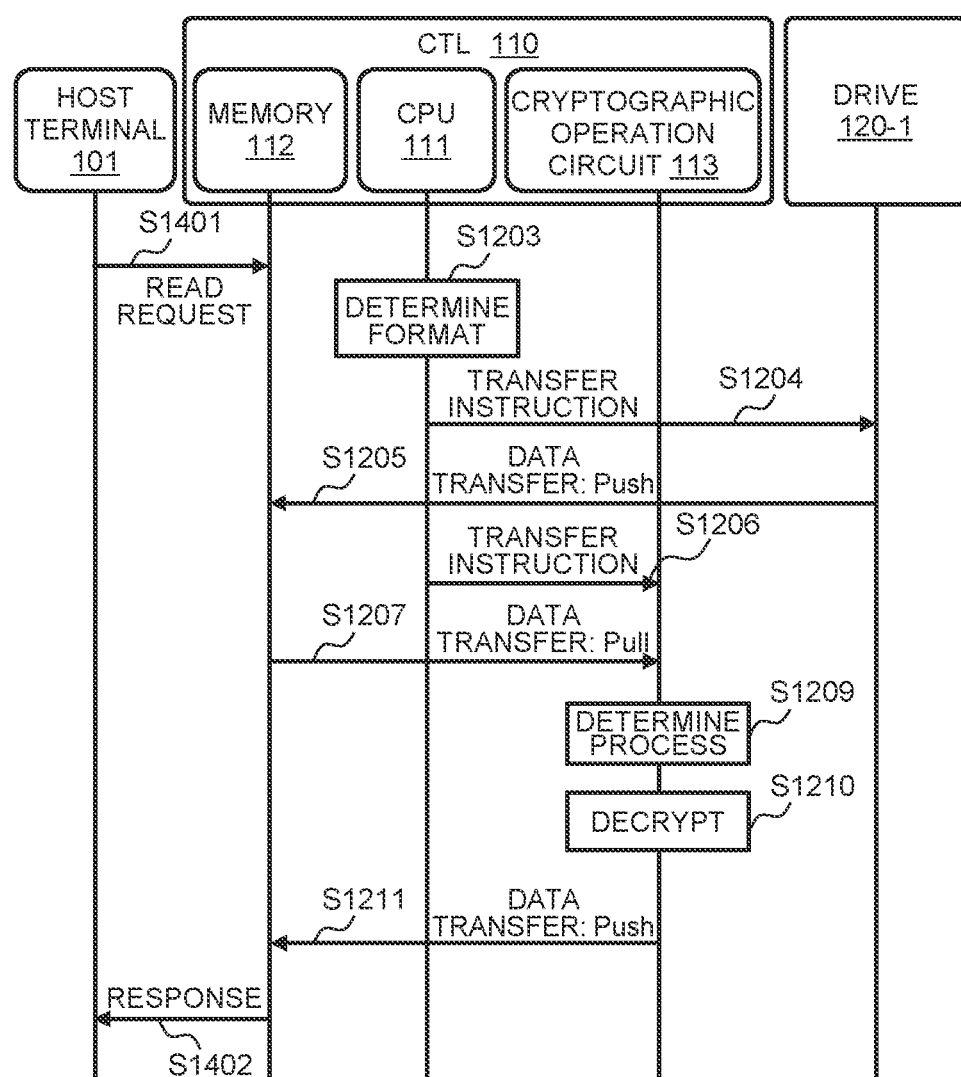
FIG. 14 shows an example of a process flow pertaining to the read process according to the first embodiment.

FIG. 14 shows an example of a process flow pertaining to the read process. In FIG. 14, a case where the read data is read from the internal drive 120-1 is exemplified and described.

When a read request (read command) is issued by the host terminal 101, the read request is stored in the memory 112 (S1401).

Upon receipt of the read command, the CPU 111 performs format determination (S1203) and the like. Subsequently, the CPU 111 notifies the drive 120-1 of the drive transfer instruction (S1204).

Subsequently, the drive 120-1 reads the data from the storage area, based on the drive transfer instruction, and transfers the read data to the memory 112 (S1205).

Subsequently, the CPU 111 notifies the cryptographic operation circuit 113 of the circuit transfer instruction (S1206).

Subsequently, the cryptographic operation circuit 113 transfers the data read from the drive 120-1, from the memory 112 to the cryptographic operation circuit 113, based on the circuit transfer instruction (S1207). Subsequently, the cryptographic operation circuit 113 performs process determination (S1209), decryption (S1210) and the like, and transfers the decrypted data from the cryptographic operation circuit 113 to the memory 112 (S1211).

Subsequently, the CPU 111 replies to the host terminal 101 with the decrypted data (S1402).

According to this embodiment, the encryption engine is integrated. Consequently, the security level of the encryption algorithm and FIPS authentication are made uniform, which can secure the security of the entire storage system. Note that if the encryption engine is not integrated, even possible partial vulnerability threatens the security of the entire storage system. Accordingly, the security risk becomes high.

For example, conventionally, the cryptographic operation processing methods are different between the SAS scheme and the other schemes. However, according to the format of the cryptographic operation determined by the CPU, the methods are switched by the cryptographic operation circuit, and the cryptographic operations can be performed. Encryption according to the same encryption algorithm also provides an advantage of securing the data reliability that is common among the protocols.

According to this embodiment, the same encryption engine (hardware) is used for all the drives, which negates the need to create microcomputers for each encryption engine. Furthermore, the cryptographic operations of multiple protocols can be achieved by the same procedures. Accordingly, even in a case where a protocol (the format of a cryptographic operation) is added in products in the futures, the case can be quickly supported, and the time period from product projection to getting the product to market can be reduced, which can maintain the competitiveness.

(II) Second Embodiment

A second embodiment is different in that the cryptographic operation circuit 113 is not coupled to the PCIeSW 114-2 but is coupled to the PCIeSW 114-1. The other components are the same as the components of the first embodiment. Accordingly, the description is omitted.

Figure 15:
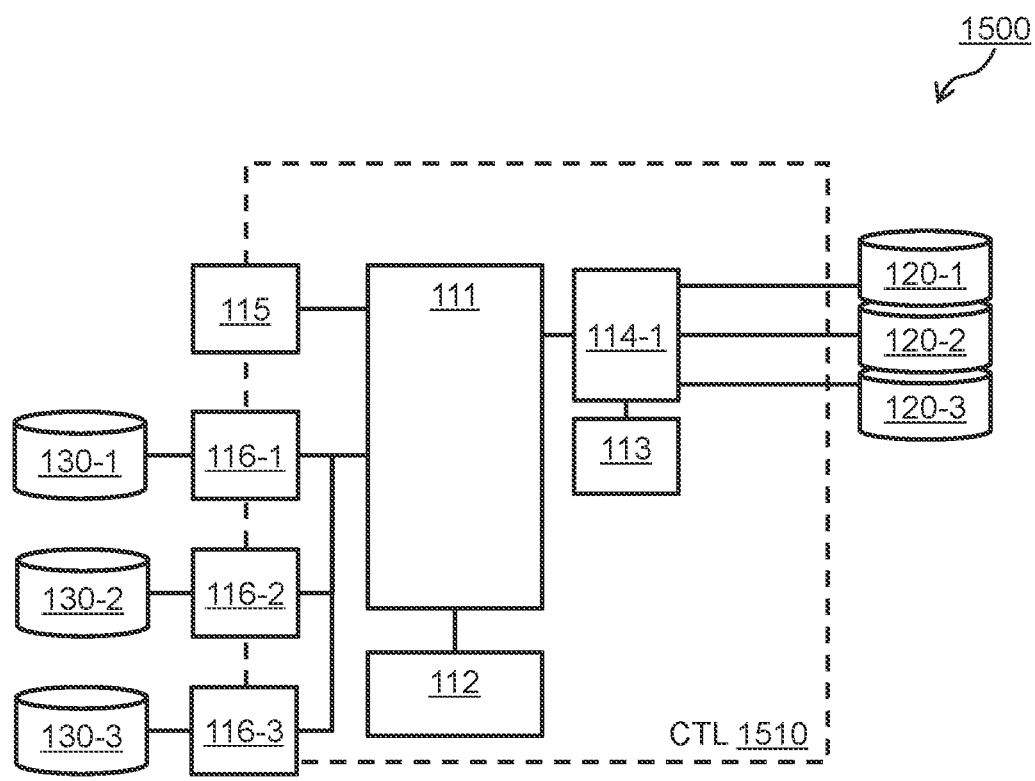
FIG. 15 shows an example of a configuration pertaining to a storage system according to a second embodiment.

FIG. 15 shows an example of a configuration pertaining to a storage system 1500 according to this embodiment. The storage system 1500 includes a CTL 1510. In the CTL 1510, the CPU 111 and the cryptographic operation circuit 113 are coupled to each other via the PCIeSW 114-1.

According to this embodiment, the PCIeSW 114-2 is not provided. Accordingly, this embodiment is more advantageous in cost and implementation than the first embodiment. In addition, the first embodiment has a lower data flow rate between the CPU 111 and the PCIeSW 114-1 than the configuration of the second embodiment does. Accordingly, the first embodiment is more advantageous in storage system performance.

(III) Third Embodiment

A third embodiment is different from the first embodiment in that DIP (Data In Place) for upgrading the CTL 110 is performed with the data in the drives 120 being left as it is. In this embodiment, the description of the components identical to those of the first embodiment is omitted.

According to the DIP in this embodiment, various types of information stored in the memory used in an old CTL are transferred to a new CTL. Here, as described below, multiple schemes are conceivable as handoff schemes for various types of data. Any of the handoff schemes may be used, or another handoff scheme may be used.

(Handoff scheme 1) A scheme of additionally providing a node (new CTL), copying various types of information from the old CTL to the new CTL via an interconnect controller, and removing the old CTL after copying.

(Handoff scheme 2) A scheme of writing various types of information in the old CTL to an external storage device, replacing the CTL with a new CTL, and then copying the various types of data from the external storage device to the new CTL.

(Handoff scheme 3) A scheme of coupling an old CTL to a new CTL using an external IF, and causing a maintenance operator to copy various types of information.

Figure 16:
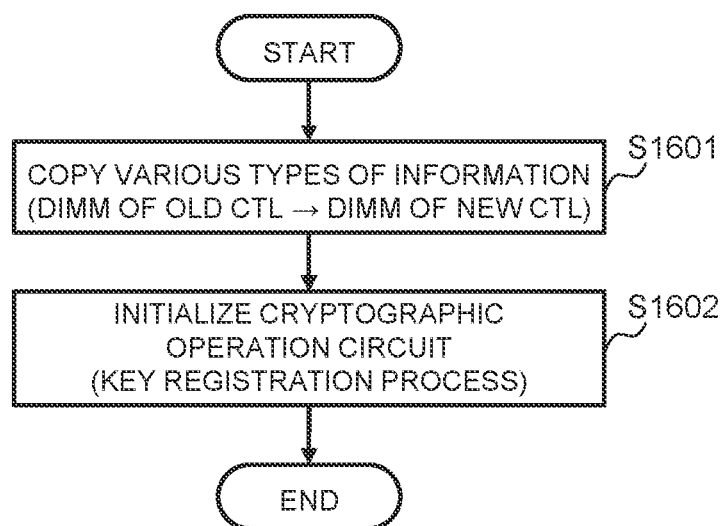
FIG. 16 shows an example of a DIP process according to a third embodiment.

FIG. 16 shows an example of a DIP process. The DIP process is started, for example, at predetermined timing in a case where a new CTL (CTL 110) is additionally provided.

In S1601, the CPU 111 of the CTL 110 copies various types of information from the memory of the old CTL. For example, the CPU 111 copies information stored in the memory of the old CTL to the memory 112 of the own CTL 110. For example, in a case where the old CTL has a configuration including a cryptographic operation circuit 113, the information includes the registered key information 112A, the format management information 112B and the encryption setting information 112C. Note that in a case where the old CTL has a configuration including no cryptographic operation circuit 113 and stores the encryption key, a configuration of obtaining the encryption key may be adopted, and a configuration of obtaining the encryption key from a key management server may be adopted.

In S1602, the CPU 111 initializes the cryptographic operation circuit 113. For example, the CPU 111 performs the key registration process, the encryption necessity setting process and the like.

Figure 17:
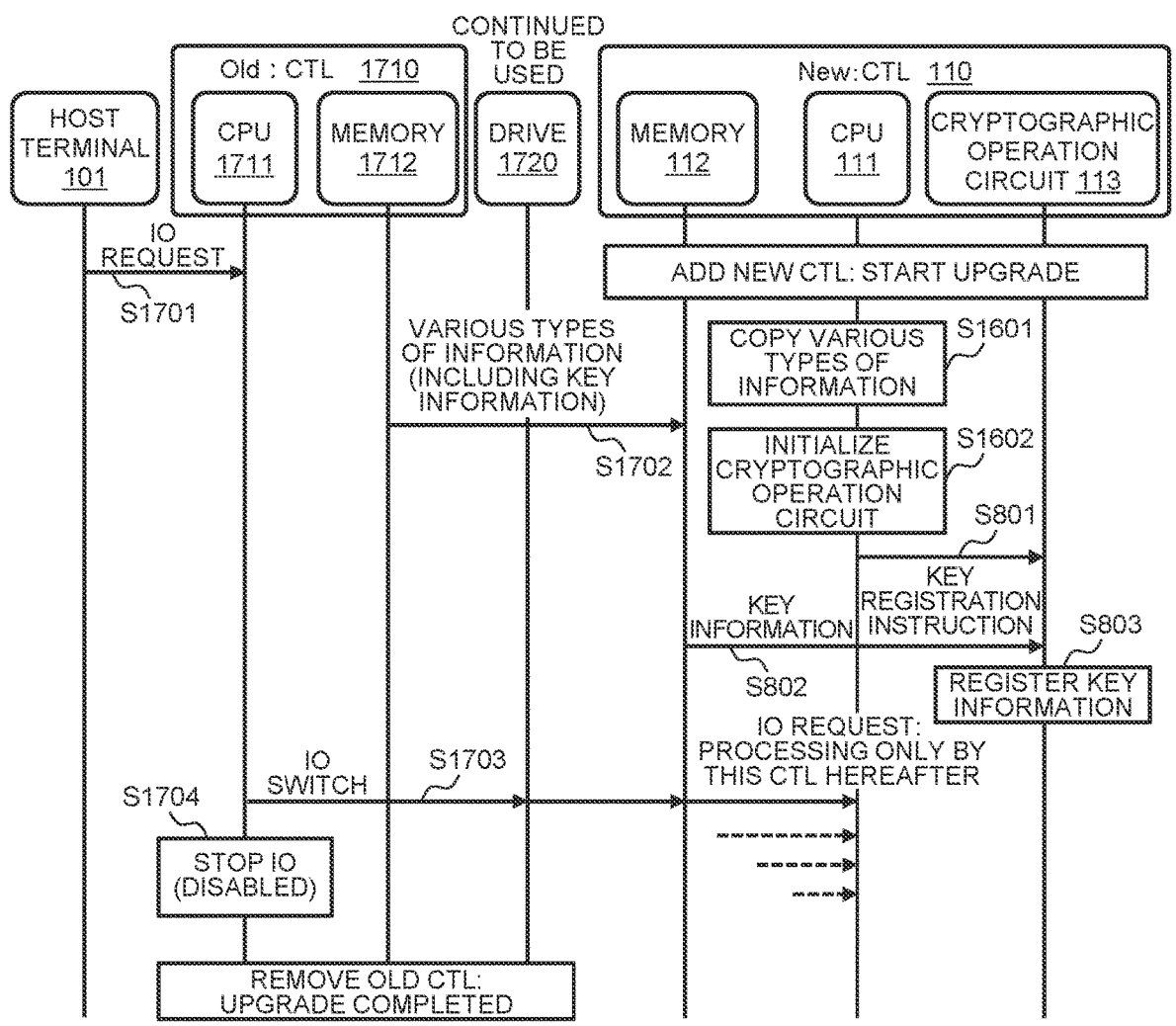
FIG. 17 shows an example of a process flow pertaining to the DIP process according to the third embodiment.

FIG. 17 shows an example of a process flow pertaining to the DIP process. Referring to FIG. 17, a case where an old CTL (CTL 1710) includes no cryptographic operation circuit 113 is exemplified and described.

As shown in FIG. 17, the CTL 1710 accepts an IO request issued by the host terminal 101, and controls input and output to and from a drive 1720 (S1701).

After a new CTL (CTL 110) is additionally provided, the CPU 111 of the CTL 110 reads various types of information on a memory 1712 in various types of information copying (S1601), and stores the read information in the memory 112 (S1702). For example, when data on the encryption key is stored on the memory 1712, the CPU 111 stores the data on the encryption key on the memory 112.

Subsequently, the CPU 111 executes the key registration process in the cryptographic operation circuit initialization (S1602). In the key registration process, the CPU 111 notifies the cryptographic operation circuit 113 of the key registration instruction about the obtained registered key (S801). The cryptographic operation circuit 113 reads the encryption key from the memory 112 (S802), and stores the encryption key as key information 113A (S803).

Subsequently, IO switching is performed (S1703), the CPU 111 accepts an IO request issued by the host terminal 101, and controls input and output to and from the drive 1720.

Subsequently, the CPU 1711 stops the IO-related processes, and the CTL 1710 is disabled (S1704). Subsequently, the CTL 1710 is removed.

According to this embodiment, the encryption key used in the drive coupled to the old CTL is handed off to the new CTL. Consequently, the old CTL is upgraded to the new CTL, with the data in the drive coupled to the old CTL being left as it is.

(IV) Fourth Embodiment

A fourth embodiment is different from the first embodiment in that two CTLs are provided and redundancy is achieved. In this embodiment, the description of the components identical to those of the first embodiment is omitted.

Figure 18:
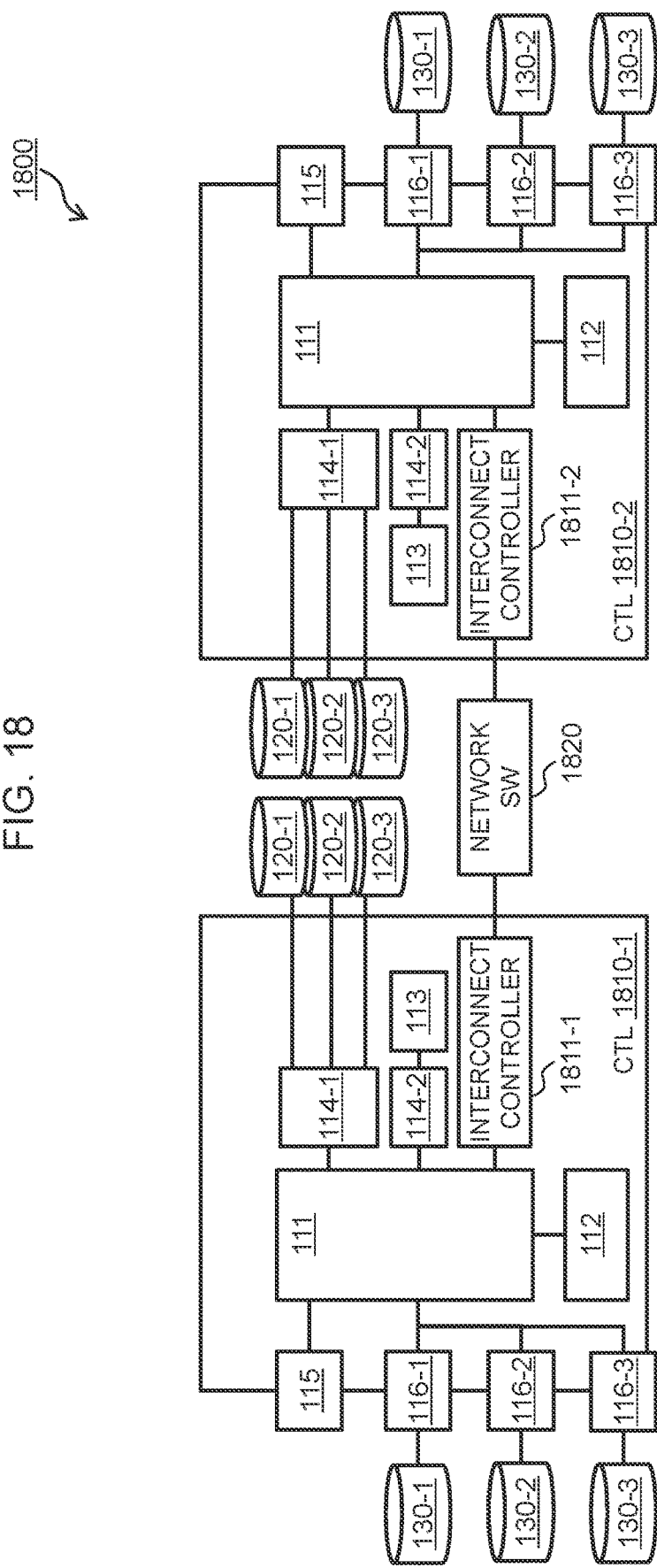
FIG. 18 shows an example of a configuration pertaining to a storage system according to a fourth embodiment.

FIG. 18 shows an example of a configuration pertaining to a storage system 1800 according to this embodiment.

The storage system 1800 includes two CTLs 1810. The CTLs 1810 respectively include interconnect controllers 1811 that perform communication between the CTLs 1810. For example, one CTL 1810 and the other CTL 1810 are communicably coupled to each other by the interconnect controllers 1811. A redundant configuration is adopted where even in case one CTL 1810 fails, the operation is continued by the other CTL 1810.

More specifically, the CTL 1810-1 includes the interconnect controller 1811-1, and the CTL 1810-2 includes the interconnect controller 1811-2. The interconnect controller 1811-1 and the interconnect controller 1811-2 are coupled to each other via a network SW 1820.

Note that the configuration in this embodiment is not limited to the configuration described above. A configuration of directly coupling the interconnect controllers 1811 to each other may be adopted.

In the storage system 1800, for example, replacement (upgrade) of one CTL 1810 is performed, and subsequently replacement (upgrade) of the other CTL 1810 is performed.

According to this embodiment, in a state where the power source is on (in-operation state), the old CTL can be upgraded to the new CTL, with the data in the drive being left as it is.

(V) Fifth Embodiment

A fifth embodiment is different from the fourth embodiment in that multiple nodes each including two CTLs for achieving redundancy are provided. In this embodiment, the description of the components identical to those of the fourth embodiment is omitted.

Figure 19:
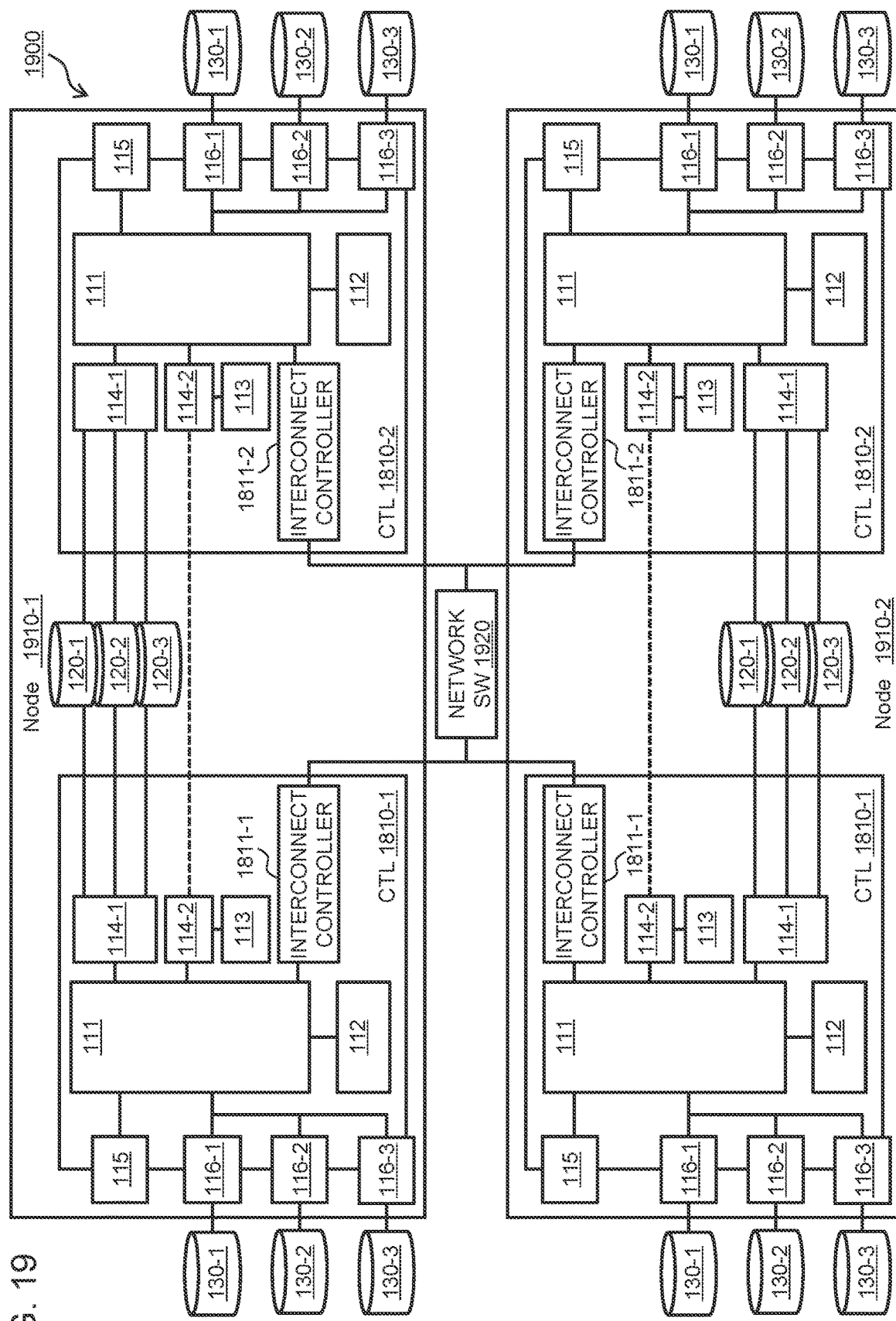
FIG. 19 shows an example of a configuration pertaining to a storage system according to a fifth embodiment.

FIG. 19 shows an example of a configuration pertaining to a storage system 1900 according to this embodiment.

The storage system 1900 includes multiple nodes 1910. Each node 1910 includes two CTLs 1810, and achieves a redundant configuration.

The configuration in this embodiment is not limited to the configuration described above. For example, a configuration may be adopted where PCIeSWs 114-2, to which the cryptographic operation circuits 113 are coupled, are coupled to each other.

According to this embodiment, the old node can be upgraded to the new node, with the data in the drive being left as it is.

(VI) Supplement

The embodiments described above include, for example, the following content.

In the aforementioned embodiments, the cases of applying the present invention to the storage systems have been described. However, the present invention is not limited to such cases, and is applicable widely to other various systems, devices, methods and programs.

In the aforementioned embodiments, the configuration of each table is only an example. One table may be divided into two or more tables. All or some of two or more tables may be one table.

In the aforementioned embodiments, for the sake of description, the information pertaining to the storage system has been described using the table. However, the data structure is not limited to the table. The information pertaining to the storage system may be represented by a data structure other than the table, i.e., by XML (Extensible Markup Language), YAML (YAML Ain't a Markup Language), a hash table, a tree structure and so forth.

In the above description, the information on the program, the table, the file and the like for achieving each function may be provided in a storage device, such as a memory, a hard disk or an SSD (Solid State Drive), or a recording medium, such as an IC card, an SD card or a DVD.

The aforementioned embodiments have, for example, the following characteristic configurations.

(1)

A storage system (e.g., a storage system 100, a storage system 1500, a storage system 1800 or a storage system 1900) includes: a plurality of storage devices (e.g., drives 120) configured to store encrypted data; and a controller (e.g., a CTL 110, a CTL 1510 or a CTL 1810) configured to control input and output to and from each of the plurality of storage devices, wherein the controller comprises: a memory (e.g., a memory 112) configured to store format management information (e.g., format management information 112B or a format management table 300) that includes information indicating a format (e.g., "SAS" or "NVMe") of a cryptographic operation corresponding to each of the storage devices; a processor (e.g., a CPU 111) configured to determine the format corresponding to the storage device, from the format management information, based on a request by a host terminal (e.g., a host terminal 101) for input and output to and from the storage device; and a cryptographic operation circuit (e.g., a cryptographic operation circuit 113) configured to encrypt data according to the format determined by the processor based on a request (e.g., a write command) by the host terminal for writing the data into the storage device, and decrypt the encrypted data on the data stored in the storage device according to the format determined by the processor based on a request (e.g., a read command) by the host terminal for reading the data from the storage device.

According to the configuration described above, even in a case where the formats of cryptographic operations are different among the storage devices, the format of the cryptographic operation suitable for the storage device is determined by the processor. Accordingly, the cryptographic operation according to the format determined by the processor is performed by the cryptographic operation circuit. According to the configuration described above, for example, without creation of the cryptographic operation circuits for each storage device, encryption by hardware can be achieved.

(2)

The memory stores registered key information (e.g., registered key information 112A or a registered key table 200) that includes an address range (e.g., an address range 201) indicating a predetermined storage area provided in the storage device, an encryption key (e.g., an encryption key 203) associated with the address range, and identification information (e.g., a key index 202) on the encryption key, the processor generates key registration instruction information that includes a memory address (e.g., a transfer source address) indicating the storage area of the memory that stores the encryption key, and the identification information, and is for registering the encryption key, and upon receipt of the key registration instruction information, the cryptographic operation circuit reads, from the memory, the encryption key stored in the storage area at the memory address, and stores key information (e.g., key information 113A or a key table 500) that associates the read encryption key with the identification information (for example, see FIG. 8).

According to the configuration described above, for example, the encryption key having already been used in the storage system can be registered in the cryptographic operation circuit. Accordingly, the controller can be upgraded, with the encrypted data stored in the storage device being left as it is.

(3)

The format management information stored in the memory includes information that associates an address range (e.g., an address range 301) indicating a predetermined storage area provided in the storage device with the format (e.g., a format 302) of the cryptographic operation corresponding to the storage device, when a request issued by the host terminal is a request for writing data in the storage area of a storage device address in the storage device, the processor generates circuit instruction information (e.g., circuit transfer instruction information 600) that includes: a request type indicating the request for writing; identification information on the encryption key corresponding to the storage device address; first memory address indicating the storage area of the memory that stores the data; a second memory address of the memory for designating storage area that stores encrypted data obtained by encrypting the data; and a format of the cryptographic operation corresponding to the storage device, upon receipt of the circuit instruction information, the cryptographic operation circuit: reads, from the memory, the data stored in the storage area at the first memory address; reads the encryption key associated with the identification information, from the stored key information; and stores the encrypted data obtained by encrypting the data using the encryption key according to the format, in the storage area at the second memory address, the processor generates storage device instruction information (e.g., drive transfer instruction information 700) that includes information on the request type indicating the request for writing, on the storage device address, and on the second memory address, and upon receipt of the storage device instruction information, the storage device stores the encrypted data stored in the storage area at the second memory address, in the memory area at the storage device address (for example, see FIG. 11).

According to the configuration described above, the information on the request type, on the identification information about the encryption key and on the format of the cryptographic operation is included in the circuit instruction information. Consequently, for example, upon receipt of the circuit instruction information, the cryptographic operation circuit can encrypt data, using the encryption key, according to the format corresponding to the storage device.

(4)

When the request by the host terminal is a request of reading the encrypted data from the storage area at the storage device address in the storage device, the processor generates the storage device instruction information (e.g., drive transfer instruction information 700) that includes information on the request type indicating the request of reading, on the storage device address, and on a third memory address that is of the memory and is for designating the storage area that stores the encrypted data read from the storage device, upon receipt of the storage device instruction information, the storage device reads the encrypted data from the storage area at the storage device address, and stores the read encrypted data in the storage area at the third memory address, the processor generates the circuit instruction information (e.g., circuit transfer instruction information 600) that includes information on the request type indicating the request for reading, on the identification information about the encryption key corresponding to the storage device address, on the third memory address, on a fourth memory address that is of the memory and is for designating the storage area that stores data obtained by decrypting the encrypted data, and on the format of the cryptographic operation corresponding to the storage device, and upon receipt of the circuit instruction information, the cryptographic operation circuit: reads, from the memory, the encrypted data stored in the storage area at the third memory address; reads the encryption key associated with the identification information, from the stored key information; and stores the data obtained by decrypting the encrypted data using the encryption key according to the format, in the storage area at the fourth memory address, and the processor replies to the host terminal with the data stored in the storage area at the fourth memory address (for example, see FIG. 12).

According to the configuration described above, the information on the request type, on the identification information about the encryption key and on the format of the cryptographic operation is included in the circuit instruction information. Consequently, for example, upon receipt of the circuit instruction information, the cryptographic operation circuit can decrypt the encrypted data, using the encryption key, according to the format corresponding to the storage device.

(5)

The memory stores encryption setting information (e.g., encryption setting information 112C or an encryption setting table 400) that includes an address range indicating a predetermined storage area provided in the storage device, and necessity information indicating necessity of the cryptographic operation corresponding to the storage device, the processor identifies the necessity information corresponding to the storage device address, based on the request by the host terminal for writing data to the storage device address in the storage device, and upon determination that the cryptographic operation is required based on the necessity information identified by the processor, the cryptographic operation circuit encrypts the data according to the format determined by the processor.

According to the configuration described above, for example, the user can set the necessity of the cryptographic operation for each storage area. For example, the user sets the cryptographic operation for every storage area, thus allowing the cryptographic operation to be performed by the same cryptographic operation circuit for every storage device. Accordingly, the security level of the storage system can be constant. Consequently, cyberattacks for storage devices having a relatively low security level can be avoided, which can make the security of the storage system robust.

(6)

In the storage system, the controller, and another controller that has a same configuration as the controller and is for making the controller redundant are provided (for example, see FIGS. 18 and 19), and the controller and the other controller include an interconnect controller for performing communication between the controllers.

According to the configuration described above, for example, the controller is made redundant, which can upgrade the controller without stopping the storage system.

(7)

The cryptographic operation circuit is coupled to the processor via a PCIeSW (Peripheral Component Interconnect Express Switch) (for example, see FIGS. 1, 15, 18 and 19).

According to the configuration described above, for example, extendibility, such as a capability of adding an additional cryptographic operation circuit, another accelerator and the like, can be secured.

(8)

At least one storage device among the storage devices, and the processor are coupled to a PCIeSW (Peripheral Component Interconnect Express Switch).

For example, an NVMe drive directly coupled to PCIeSW does not support encryption by hardware. However, the configuration described above enables encryption by the cryptographic operation circuit to be achieved. For example, even with the configuration provided with an NVMe drive directly coupled to PCIeSW, encryption by hardware with higher security than encryption by software through a CPU or the like can be achieved.

The cryptographic operation circuit described above may have a configuration directly coupled to the processor described above without intervention of PCIeSW. The configurations described above may be appropriately changed, replaced, combined or omitted in a range without departing from the gist of the present invention.

It should be construed that items included in a list having a form of "at least one of A, B and C" can mean that (A), (B), (C), (A and B), (A and C), (B and C) or (A, B, and C). Likewise, items listed in the form of "at least one of A, B or C" can mean that (A), (B), (C), (A and B), (A and C), (B and C) or (A, B, and C).

What is claimed is:

1. A storage system comprising: a plurality of storage devices configured to store encrypted data; and a controller configured to control input and output to and from each of the plurality of storage devices,
wherein the controller comprises:
a memory configured to store format management information that includes information indicating a format of a cryptographic operation corresponding to each of the plurality of storage devices;
a processor configured to determine the format corresponding to a storage device of the plurality of storage devices, from the format management information, based on a request by a host terminal for input and output to and from the storage device; and
a cryptographic operation circuit configured to encrypt data according to the format determined by the processor based on a request by the host terminal for writing the data into the storage device, and decrypt the encrypted data on the data stored in the storage device according to the format determined by the processor based on a request by the host terminal for reading the data from the storage device.

2. The storage system according to claim 1,
wherein the memory stores registered key information that includes an address range indicating a predetermined storage area provided in the storage device, an encryption key associated with the address range, and identification information on the encryption key,
the processor is configured to generate key registration instruction information that includes a memory address indicating the storage area of the memory that stores the encryption key, and the identification information, and
upon receipt of the key registration instruction information, the cryptographic operation circuit is configured to read, from the memory, the encryption key stored in the storage area at the memory address, and store key information that associates the read encryption key with the identification information.

3. The storage system according to claim 2,
wherein the format management information stored in the memory includes information that associates an address range indicating a predetermined storage area provided in the storage device with the format of the cryptographic operation corresponding to the storage device,
when a request issued by the host terminal is a request for writing data in the storage area of a storage device address in the storage device, the processor is configured to generate circuit instruction information that includes: a request type indicating the request for writing; identification information on the encryption key corresponding to the storage device address; first memory address indicating the storage area of the memory that stores the data; a second memory address of the memory for designating storage area that stores encrypted data obtained by encrypting the data; and a format of the cryptographic operation corresponding to the storage device, upon receipt of the circuit instruction information, the cryptographic operation circuit is configured to:
- read, from the memory, the data stored in the storage area at the first memory address;
- read, the encryption key associated with the identification information, from the stored key information; and
- store the encrypted data obtained by encrypting the data using the encryption key according to the format, in the storage area at the second memory address, the processor is configured to generate storage device instruction information that includes information on the request type indicating the request for writing, on the storage device address, and on the second memory address, and upon receipt of the storage device instruction information, the storage device stores the encrypted data stored in the storage area at the second memory address, in the memory area at the storage device address.

4. The storage system according to claim 3, wherein when the request by the host terminal is a request of reading the encrypted data from the storage area at the storage device address in the storage device, the processor is configured to generate the storage device instruction information that includes information on the request type indicating the request of reading, on the storage device address, and on a third memory address that is of the memory and is for designating the storage area that stores the encrypted data read from the storage device, upon receipt of the storage device instruction information, the storage device reads the encrypted data from the storage area at the storage device address, and stores the read encrypted data in the storage area at the third memory address, the processor is configured to generate the circuit instruction information that includes information on the request type indicating the request for reading, on the identification information about the encryption key corresponding to the storage device address, on the third memory address, on a fourth memory address that is of the memory and is for designating the storage area that stores data obtained by decrypting the encrypted data, and on the format of the cryptographic operation corresponding to the storage device, and upon receipt of the circuit instruction information, the cryptographic operation circuit is configured to:
- read, from the memory, the encrypted data stored in the storage area at the third memory address;
- read, the encryption key associated with the identification information, from the stored key information; and
- store the data obtained by decrypting the encrypted data using the encryption key according to the format, in the storage area at the fourth memory address, and the processor is configured to reply to the host terminal with the data stored in the storage area at the fourth memory address.

5. The storage system according to claim 1, wherein the memory stores encryption setting information that includes an address range indicating a predetermined storage area provided in the storage device, and necessity information indicating necessity of the cryptographic operation corresponding to the storage device, the processor is configured to identify the necessity information corresponding to the storage device address, based on the request by the host terminal for writing data to the storage device address in the storage device, and upon determination that the cryptographic operation is required based on the necessity information identified by the processor, the cryptographic operation circuit is configured to encrypt the data according to the format determined by the processor.

6. The storage system according to claim 1, wherein the controller and another controller that has a same configuration as the controller are provided to make the controller redundant, and the controller and the another controller include an interconnect controller for performing communication between the controller and the another controller.

7. The storage system according to claim 1, wherein the cryptographic operation circuit is coupled to the processor via a PCIeSW (Peripheral Component Interconnect Express Switch).

8. The storage system according to claim 1, wherein at least one storage device among the plurality of storage devices, and the processor are coupled to a PCIeSW (Peripheral Component Interconnect Express Switch).

9. A cryptographic operation method for a storage system that comprises: a plurality of storage devices configured to store encrypted data; and a controller configured to control input and output to and from each of the plurality of storage devices, wherein the controller includes a memory, a processor, and a cryptographic operation circuit, the method comprising the steps of:
- causing the memory to store format management information that includes information indicating a format of a cryptographic operation corresponding to each of the plurality of storage devices;
- causing the processor to determine the format corresponding to a storage device of the plurality of storage devices, from the format management information, based on a request by the host terminal for input and output to and from the storage device; and
- causing the cryptographic operation circuit to encrypt data according to the format determined by the processor based on a request by the host terminal for writing the data into the storage device, and decrypt the encrypted data on the data stored in the storage device according to the format determined by the processor based on a request by the host terminal for reading the data from the storage device.

\* \* \* \* \*